April 11, 1967      A. W. HAYDON      3,313,994
TIMER-ACTUATED MOTOR SPEED CONTROL SYSTEM
Filed April 13, 1964      3 Sheets-Sheet 1

INVENTOR.
ARTHUR W. HAYDON
BY
his ATTORNEYS

INVENTOR.
ARTHUR W. HAYDON

April 11, 1967        A. W. HAYDON        3,313,994

TIMER-ACTUATED MOTOR SPEED CONTROL SYSTEM

Filed April 13, 1964        3 Sheets-Sheet 3

INVENTOR.
ARTHUR W. HAYDON

BY his ATTORNEYS

# United States Patent Office 3,313,994
Patented Apr. 11, 1967

3,313,994
TIMER-ACTUATED MOTOR SPEED
CONTROL SYSTEM
Arthur W. Haydon, Milford, Conn., assignor to
Tri-tech, Inc., a corporation of Connecticut
Filed Apr. 13, 1964, Ser. No. 359,296
2 Claims. (Cl. 318—311)

This invention relates to systems for controlling the rotational speed of electric motors and, more particularly, to a new and improved motor speed control system capable of regulating the speed of an electric motor with a high degree of accuracy at any desired value over a broad range.

Conventional electric motors, other than those of the synchronous type, are subject to wide variations in motor speed resulting from changes in load or supply voltage, for example. To reduce these speed variations, a governor of the centrifugal type is often provided whereby the application of power to the motor is controlled by a centrifugal switch device mounted on the rotor which opens and closes in accordance with the motor speed. Centrifugal switch governors, however, are not capable of providing speed regulation within less than a few percent of the desired value and, moreover, they do not ordinarily permit adjustment of the regulated motor speed during operation.

Accordingly, it is an object of the present invention to provide a new and improved motor speed control system which overcomes the above-mentioned disadvantages of present systems.

Another object of the invention is to provide a motor speed control system for non-synchronous electric motors which is capable or regulating motor speed to within a small fraction of one percent of a desired value.

A further object of the invention is to provide a motor speed control system whereby the speed of a motor may be regulated with high accuracy to any desired value within a wide range of values.

An additional object of the invention is to provide an electric motor assembly which is especially adapted for use with control systems of the above character.

These and other objects of the invention are attained by providing a detector arrangement adapted to detect the passage of a selected element located on the rotor of a motor and thereby respond in proportion to the speed of rotation of the rotor, and a power control device responsive to the detector to control the application of power to the motor. More specifically, the invention contemplates the provision of a detecting device adjacent to the rotor of a motor or its shaft so that the detector can detect and respond to the passage of a reference element on the rotor or the shaft during motor operation. In one embodiment, the detector comprises a coil disposed between the poles of a field magnet for the motor and the reference element comprises a piece of magnetic material movable between the poles of the magnet in response to rotation of the rotor. In another embodiment, the detector comprises an electric probe engaging and responsive to motion of the commutator elements on the rotor.

In order to control the application of power to the motor, the invention contemplates a periodic power supply arrangement wherein the duration of the periods of power supply to the motor are controlled by signals from the speed detector. Preferably, an adjustable timer is used to initiate the supply of power to the motor at regular time intervals, the spacing of which is selected in accordance with the desired motor speed. In certain arrangements, a bi-stable mechanical switch responsive to signals from the detector to move to one position and to signals from the adjustable timer to move to another position is utilized and motion of the switch in response to detector actuation may either discontinue application of power or reverse the polarity of the power applied to the motor. In other embodiments, electronic switching is provided in place of mechanical switching.

Further objects and additions of the invention will be apparent from a reading of the following description in conjunction with the accompanying drawings in which.

Figure 1:
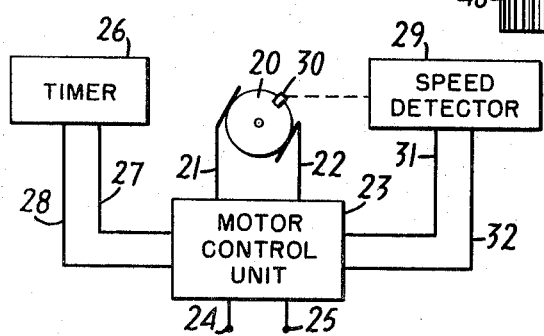
FIG. 1 is a schematic block diagram illustrating a representative motor speed control system arranged according to the invention.

In the schematic block diagram of FIG. 1, which illustrates a typical motor control system according to the invention, and electric motor 20 is connected by conductors 21 and 22 to a motor control unit 23 wherein electric power from two terminals 24 and 25 is applied to the conductors 21 and 22 in a controlled manner so as to regulate the motor speed. To this end, an adjustable timer 26, which may comprise any conventional device for providing electrical signals at uniform time intervals of selected duration, is connected to the control unit 23 to two conductors 27 and 28. As an example, the timer 26 may comprise a variable oscillator adapted to produce an output pulse of selected magnitude and duration during each cycle of oscillation. Within the unit 23, signals applied through the lines 27 and 28 are effective in a manner described hereinafter to join the power supply terminals 24 and 25 to the conductors 21 and 22 and thereby initiate the supply of power to the motor during each interval of the timer 26.

In order to control the motor speed with extreme accuracy in accordance with the invention, a motor speed detector 29 is located in proximity to the rotor of the motor 20 so as to enable it to detect and respond to a reference element 30 which is fixed in position with respect to and rotates with the rotor of the motor 20. Each time the reference element is detected, the detector generates a signal and applies it though two conductors 31 and 32 to the control unit 23 wherein the signal is effective as described hereinafter to discontinue the application of driving power from the terminals 24 and 25 to the conductors 21 and 22 of the motor 20. Accordingly, during each rotation of the rotor, power is supplied for a selected time interval, the duration of which depends upon the relation between the motor speed (or an integral multiple of the motor speed if there is more than one reference element on the rotor) and the timer frequency. Inasmuch as an increase in the duration of application of power to the motor during each timer interval will increase the motor speed, and an increase in motor speed will reduce the duration of application of power during each interval, the system is self-balancing and is capable of maintaining a desired motor speed as determined by the setting of the timer 26 precisely to the exact number of revolutions per second.

A representative motor assembly arranged according to the invention is illustrated in FIGS. 2–5. In this arrangement, which utilizes a printed circuit motor arranged according to my Patent No. 2,847,589, the motor field magnet comprises an annular ferrite type magnet 33 best seen in FIG. 3 and the rotor consists of a printed circuit disk 34 supported adjacent to the magnet, the magnetic circuit being completed through a cover 35 made of magnetic material and disposed on the opposite side of the disk 34 from the magnet 33. The entire motor assembly is supported from a base plate 36 in any conventional manner.

Figure 2:
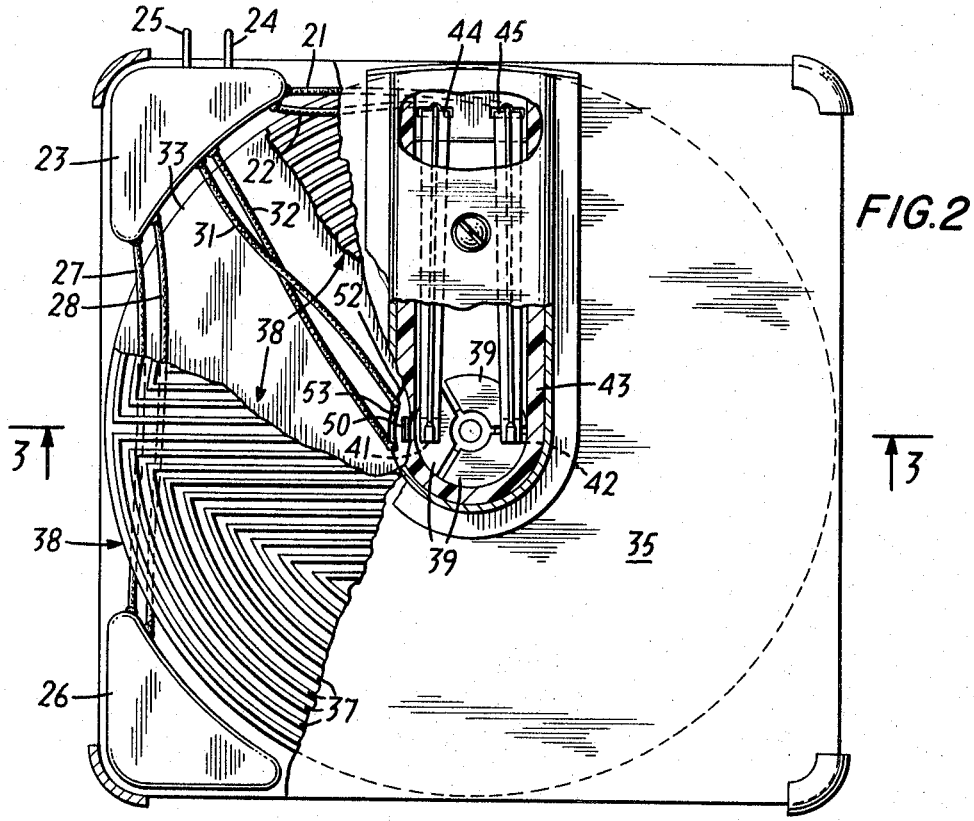
FIG. 2 is a plan view partly broken away illustrating an electric motor assembly incorporating one form of speed control system according to the invention.
Figure 3:
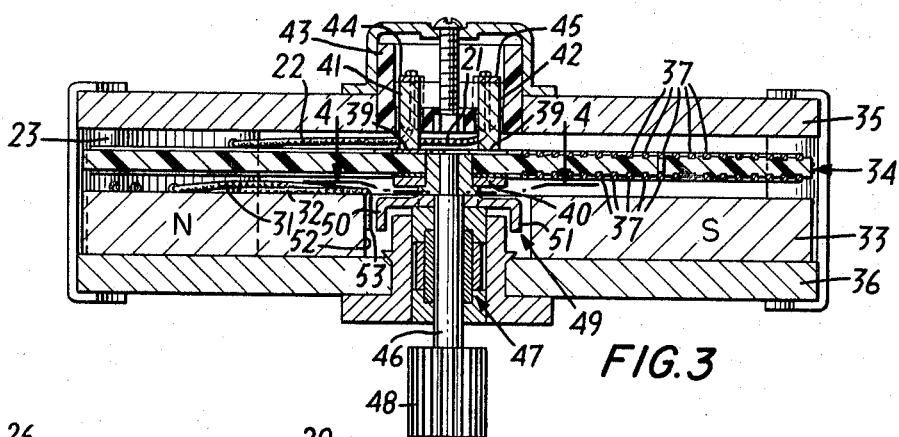
FIG. 3 is a cross-sectional view of the motor shown in FIG. 2 taken along the line 3—3 thereof and looking in the direction of the arows.

As is well understood in the art, each side of the printed circuit disk 34 has conductive paths 37 laid out in generally spiral form to provide coils 38, each of which is electrically connected at its outer end to one of a group of commutator segments 39 at the center of the disk and is connected at its inner end through the disk to the inner end of a similar coil printed on the opposite side of the disk. On the opposite side of the disk (the lower side as viewed in FIG. 3), all of the commutator segments are joined by an electrically conductive ring 40 so that the conductive path continues through another coil on the lower side of the disk and through the disk to a further coil on the top side as viewed in FIG. 3 from which it leads to a different commutator segment 39. As shown in FIGS. 2 and 3, two brushes 41 and 42, supported for vertical sliding motion in an insulative support 43, are pressed toward the commutator segments 39 on the upper side of the disk 34 by two leaf springs 44 and 45 which comprise conductors for supplying power to the rotor disk 34 through the brushes. A shaft 46, supported for rotation on the plate 36 by a bearing arrangement 47, carries the disk 34 at one end and has a drive pinion 48 affixed to the oppoiste end which projects through the mounting plate.

Figure 4:
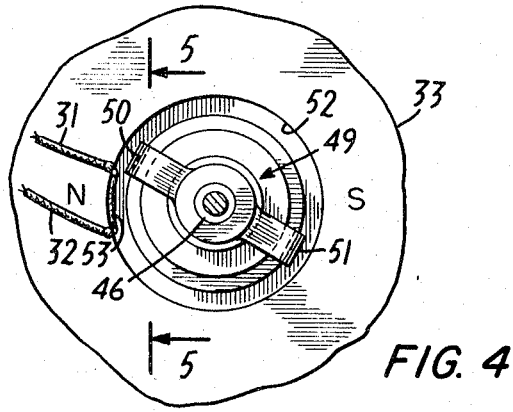
FIG. 4 is a fragmentary sectional view taken along the line 4—4 of FIG. 3 and looking in the direction of the arrows.
Figure 5:
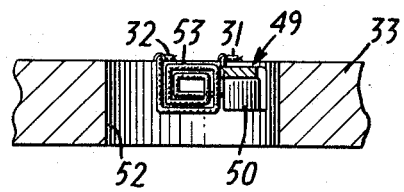
FIG. 5 is a cross-sectional view taken along the line 5—5 of FIG. 4 and looking in the direction of the arrows.

In accordance with the present invention, detection of the rotational speed of the disk 34 is made possible by mounting a U-shaped piece 49 of magnetic material, such as soft iron, on the shaft 46 in fixed position with respect to the disk 34 so that the downwardly projecting arms 50 and 51 of the piece extend into the central opening 52 of the annular magnet 33. To detect the passage of the arms 50 and 51 as the rotor turns and thereby indicates the speed of rotation of the rotor, a small flat coil of wire 53 is mounted on the inside surface of the central opening 52 as best seen in FIGS. 4 and 5 and this coil is connected through the conductors 31 and 32 which extend across the top of the magnet to the motor control unit 23 located in one corner of the motor assembly. In another corner of the assembly, the timer 26 is mounted, this unit being connected by the conductors 27 and 28 to the motor control unit 23 and, in addition, the leaf springs 44 and 45 are joined through conductors 21 and 22 to the control unit 23, the power input terminals 24 and 25 being included in that unit.

In operation, when power is initially applied to the terminals 24 and 25 of the motor assembly shown in FIGS. 2–5, it will be transmitted through the conductors 21 and 22 to the brushes 41 and 42 so as to cause the disk 34 to start turning. As the disk begins to accelerate, the rate of motion of the arms 50 and 51 of the U-shaped element 49 past the coil 52 is relatively slow so that the signals induced therein by the change in reluctance of the path through the coil when the element 49 is adjacent thereto are relatively small. The motor control unit 23 is arranged so that it will not respond to these signals until they reach a selected magnitude which results from rotation of the disk 34 at a value approaching the desired rotational speed.

When the speed of the rotor is at a value somewhat greater than half the desired rotational speed, for example, and the signals generated by the coil 53 during each passage of the arms 50 and 51 are large enough to actuate the unit 23 so as to discontinue application of power to the motor, the relation between the timer signals and the conductor signals is such that, on the average, power is applied to the motor for a longer duration during each timer interval than is necessary to maintain speed and, as a result, the speed of the motor increases. As the motor speed increases, the duration of application of driving power during each timer interval is reduced until the duration of the application of power during each interval is exactly that required to maintain the desired motor speed.

In the particular embodiment illustrated in FIGS. 2–5, the reference element 49 is detected twice during each turn of the rotor and the frequency of the pulses from the timer 26 must, therefore, be twice the speed of rotation of the rotor to provide the desired speed regulation. Consequently, when the intended speed is attained, the coil 53 transmits a signal to the control unit twice during each turn of the rotor and these signals are generated when the rotor is at the same orientations during every rotation. Moreover, since the rotor speed is maintained constant and the duration of application of power is held constant, the timer signals which cause energy to be supplied to the motor also occur at the same rotor orientations during successive cycles and these orientations precede the detector signal orientations by a given angle which is directly related to the duration of power application. In these circumstances, therefore, it is apparent that the speed of rotation of the rotor 34 is in precise synchronism with the signals from the time 26 and that this synchronism will be maintained or regained if the timer frequency is adjusted upwardly or downwardly.

Figure 6:
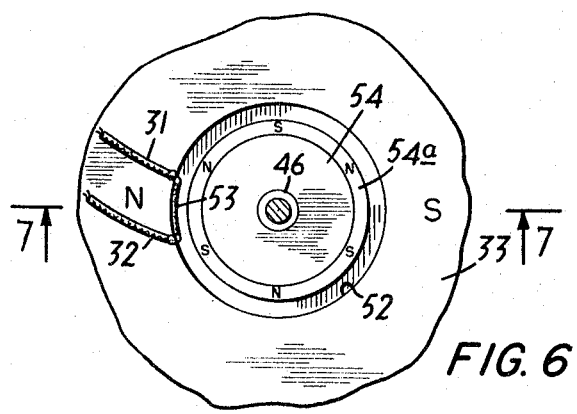
FIG. 6 is a fragmentary sectional view similar to that of FIG. 4 illustrating an alternative reference element for actuating the detector.
Figure 7:
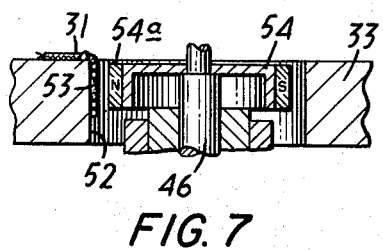
FIG. 7 is a cross-sectional view taken along the line 7—7 of FIG. 6 and looking in the direction of the arrows.

In the alternative form shown in FIGS. 6 and 7, the reference element, rather than being a U-shaped piece as shown in FIGS. 2–5, may be a circular element having a desired magnetic configuration. For example, a drum 54 may have a layer 54a of magnetizable material such as "Plastiform" coated on its peripheral surface and magnetized with alternately opposite polarity at successive angular positions. Consequently, as the rotor turns, and the magnetized portions of the layer 54a pass the coil 53, signals are generated therein by the passing magnetic flux and the rate of generation of these signals is proportional to the rotational speed of the rotor. Where several polarity reversals are provided about the periphery of the rotor, as illustrated in FIGS. 6 and 7, a corresponding number of signals is generated during each rotation and, therefore, the frequency of pulses from the timer 26 must be a corresponding multiple of the intended speed of rotation of the rotor.

Figure 8:
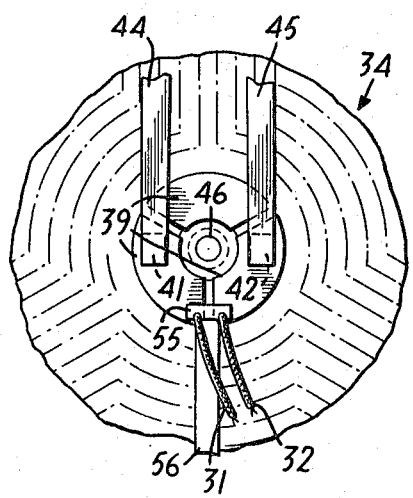
FIG. 8 is a fragmentary view of a motor similar to that of FIGS. 2 and 3 illustrating another form of detecting arrangement according to the invention.
Figure 9:
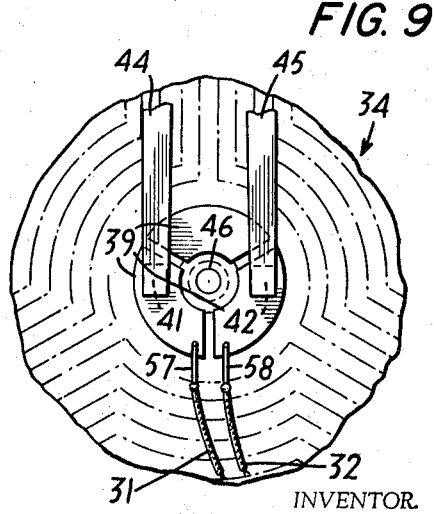
FIG. 9 is a fragmentary view similar to that of FIG. 8 showing a further form of detecting arrangement according to the invention.

Two further detecting arrangements which do not require the addition of any element to the rotor assembly are illustrated in FIGS. 8 and 9. In the arrangement shown in FIG. 8, an elongated block 55 of high resistance material is placed adjacent to the commutator segments 39 of the disk 34 and is urged into contact thereby by a spring element 56. As indicated in the drawing, the block 55 is made long enough to engage two of the commutator segments at the same time for a brief period as the disk rotates and the block is positioned on the bisector of the angle between the two brushes 41 and 42. In addition, the resistance of the material of which the block is made is high enough so that no appreciable current may be drawn through it while it is in contact with the two segments. To detect disk rotation, the conductors 31 and 32 are attached to opposite ends of the block 55, thereby detecting a potential difference and producing an actuating pulse each time the block engages to commutator segments. If desired, of course, only one of the conductors 31 and 32 may be attached to the block 55 and the other conductor may be conducted to ground, thereby providing a signal dependent upon the potential of the commutator segment engaged by the block 55 as an indication of disk rotation. Alternatively, the block 55 may be made of an appropriate semi-conductive material and a voltage may be applied across the block by the conductors 31 and 32. With this arrangement, as the gap between two adjacent commutator segments passes the block 55, the potential difference therebetween causes the block 55 to conduct so as to provide an indicating signal.

In the arrangement shown in FIG. 9, two separate spring wire feelers or ticklers 57 and 58 are mounted in fixed position so as to engage two adjacent commutator segments 39 on opposite sides of the bisector of the angle between the brushes 41 and 42. In this way, the passage of the divider between the adjacent segments can be detected without utilizing any element which is in simultaneous contact with both segments. On the other hand, if desired, only one of the feelers 57 and 58 may be used, the other one of the conductors 31 and 32 being grounded, as described above in connection with FIG. 8, since the potential difference between the commutator segments and ground at the location of the feelers varies as the disk 34 rotates.

Figure 10:
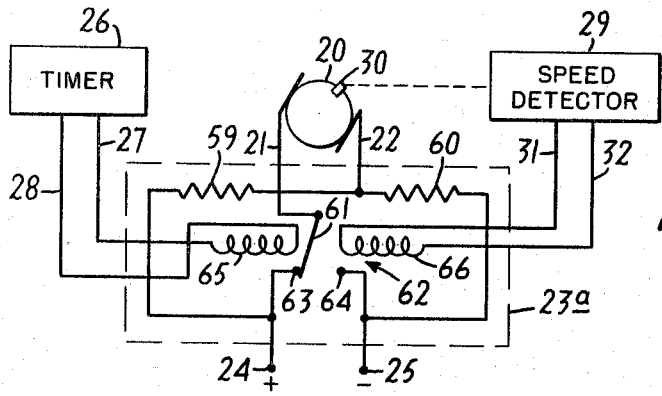
FIG. 10 is a schematic electric circuit diagram showing the arrangement of a representative control unit according to the invention.

In a representative motor control unit 23a, illustrated in FIG. 10, the terminal 24 which receives positive D.C. voltage is connected by a resistor 59 to the motor conductor 22 and the negative supply terminal 25 is also joined through a resistor 60 to the conductor 22. The motor conductor 21, moreover, is connected to the movable contact 61 of a bi-stable double throw switch 62, the fixed contacts 63 and 64 thereof being joined to the positive and negative supply terminals, respectively. In order to actuate the switch 62 so as to apply driving power to drive the motor 20 in the forward direction, an actuating coil 65 connected across the timer conductors 27 and 28 is arranged to move the switch contact 61 into engagement with the contact 63 when energized. Similarly, an actuating coil 66 connected across the detector conductors 31 and 32 is positioned to draw the movable contact 61 into engagement with the contact 64 upon energization, thereby applying a reverse voltage to the motor conductor 21. By this arrangement, positive deceleration of the motor can be produced so as to prevent overspeed. Preferably, the resistors 59 and 60 are selected so that the reverse voltage applied to the conductors 21 and 22 after actuation of the detector 29 is only a small fraction of the forward driving voltage applied prior to actuation of the detector.

When the timer 26 applies a pulse to the control unit 23a of FIG. 10, therefore, the switch contact 61 engages the contact 63, applying forward driving power to the motor 20. As the reference element 30 is detected, the coil 66 transfers the switch contact 61 to the negative terminal 64, thereby applying reverse voltage to the motor for the remainder of the timer interval.

Figure 11:
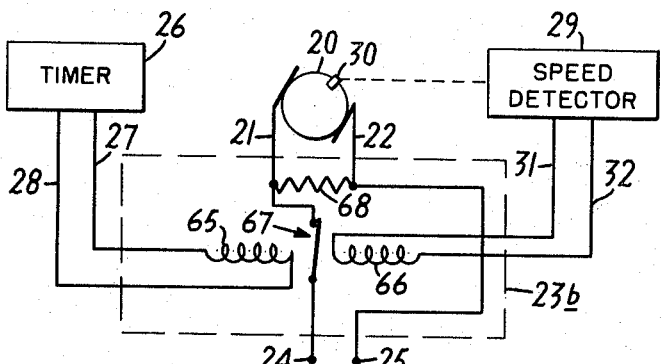
FIG. 11 is a schematic electrical circuit diagram illustrating an alternative arrangement for the control system of the invention.

In the arrangement shown in FIG. 11, a single throw switch 67 is utilized and when the timer coil 65 is energized by a timer signal, the switch closes, applying driving current to the motor. Application of a signal from the detector to the coil 66 opens the switch 67, thereby terminating the application of driving power. In this arrangement, a resistance 68 is connected across the conductors 21 and 22 to provide a shunt circuit through the rotor coils which will retard the rotor motion when the driving power is not applied. Alternatively, if desired, the movable contact of the switch 67 may be connected to the conductor 21 and a fixed contact thereof connected to the terminal 24, and the resistor 68 may be inserted between the conductor 22 and another switch contact (not shown) to which the movable contact would be drawn by energization of the coil 66.

Figure 12:
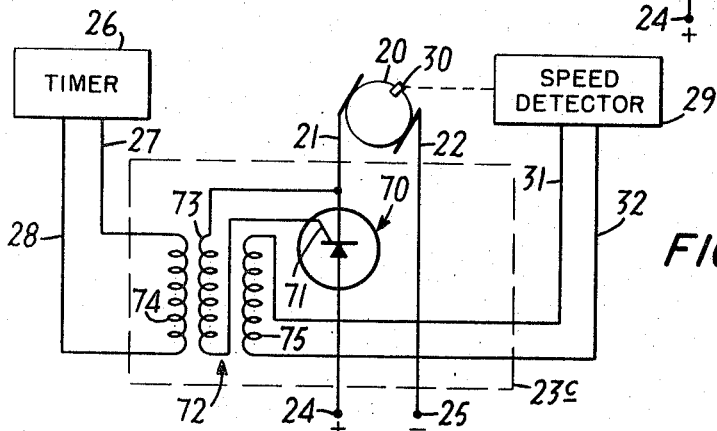
FIGS. 12 and 13 illustrate two further control systems according to the invention, each utilizing electronic switching.

For certain high speed applications, the mechanical switch control arrangements shown in FIGS. 10 and 11 may not respond as rapidly as is necessary to maintain speed with the desired accuracy. Accordingly, any appropriate electronic switching arrangement may be substituted. In FIG. 12, for example, a silicon gate turn-off switch 70 of the type designated G5U, for example, is rendered conductive by trigger signals of one polarity applied to its control electrode 71 and nonconductive by trigger signals of the opposite polarity applied to the same electrode. When the switch is conductive, current can pass from the positive terminal 24 through the switch 70 to the motor conductor 21, the return conductor 22 being connected directly to the negative terminal 25. To apply control signals to the electrode 71, a transformer 72 has an output winding 73 connected between the electrode 71 and the motor conductor 21 and two input windings 74 and 75 connected to the conductors from the timer 26 and the speed detector 29, respectively, these windings being arranged to render the switch 70 conductive upon receipt of a signal from the timer 26 and non-conductive upon receipt of a signal from the speed detector 29. Accordingly, this arrangement is effective to apply power to the motor 20 upon receipt of each timer signal and to terminate the application of power upon receipt of each speed detector signal so as to provide accurate control in the manner described previously.

Figure 13:
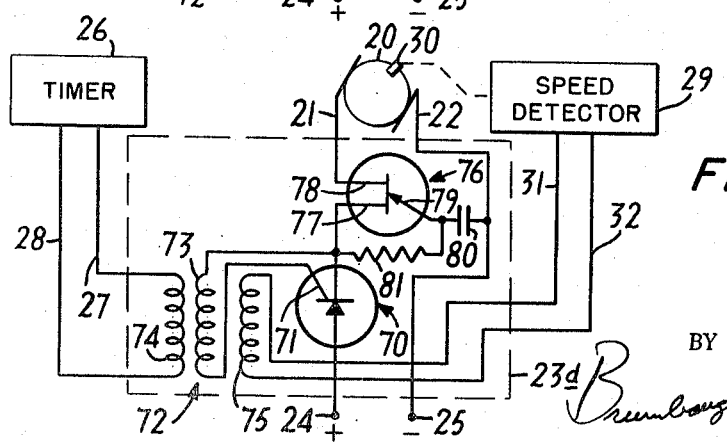

In FIG. 13, the electronic switch arrangement shown in FIG. 12 is utilized in conjunction with a power supply arranged to permit a low voltage motor to be supplied from high voltage without the power losses usually associated with the use of a resistance to reduce voltage. To this end, a unijunction transistor 76 is connected in circuit with the motor 20 to provide a relaxation oscillator arrangement. Specifically, the transistor 76 has its base electrodes 77 and 78 connected between the switch 70 and the motor conductor 21 and the emitter electrode 79 is connected through a capacitor 80 to the line joining the other motor conductor 22 to the negative terminal 25. In addition, a resistor 81 is connected between the capacitor 80 and the base electrode 77. In this arrangement, as the capacitor 80 becomes charged through the resistor 81 from the power terminals whenever the diode 70 is conductive, it reaches a potential at which the transistor 76 is rendered conductive and then discharges through the transistor and the motor 20. This cycle of operation will continue as long as the diode 70 is conductive and preferably, the circuit components are arranged so that the transistor 76 is conductive for about 50 microseconds and non-conductive for about 200 microseconds. It will be understood, of course, that the relaxation oscillator arrangement just described may be used with any other switching arrangement to permit operation of a low voltage motor from a higher voltage source.

Although the invention has been described herein with reference to specific embodiments, many modifications and variations thereof will readily occur to those skilled in the art. For example, it will be understood that appropriate amplifiers and pulse shapers, for example, may be included in the described circuits in order to control the amplitude and characteristics of the electrical signals referred to herein. Also, any appropriate optical means may be used to detect rotor motion instead of the arrangement described previously. Accordingly, all such variations and modifications are included within the in-

I claim:

1. A motor speed control system comprising detector means adapted to detect the passage of a reference element associated with the rotor of an electric motor and thereby provide signals indicative of the rate of rotation of the rotor, power supply means, semiconductor switch means for connecting the power supply means to the motor to supply driving power thereto, timer means for actuating the semiconductor switch means at selected regular time intervals which are independent of the operation of the motor so as to initiate the application of driving power to the motor, and means responsive to signals from the detector means for opening the semiconductor switch means to discontinue application of driving power to the motor.

2. A motor speed control system according to claim 1 including transformer means connected to the semiconductor switch means to provide actuating signals thereto and means connecting the timer means and the detector means to the transformer means in opposite relation.

References Cited by the Examiner

UNITED STATES PATENTS

| | | | |
|---|---|---|---|
| 2,740,080 | 3/1956 | Haydon | 318—311 |
| 2,845,587 | 7/1958 | Sampretro | 318—330 X |
| 3,038,110 | 6/1962 | Paist | 318—325 |
| 3,143,695 | 8/1964 | Hohne | 318—325 X |
| 3,187,126 | 6/1965 | De Barba | 318—331 X |
| 3,221,235 | 11/1965 | Scholl | 318—330 X |
| 3,221,236 | 11/1965 | Scholl | 318—345 X |
| 3,223,911 | 12/1965 | Seiler et al. | 318—325 |

ORIS L. RADER, *Primary Examiner.*

J. C. BERENZWEIG, *Assistant Examiner.*